Figure 1:
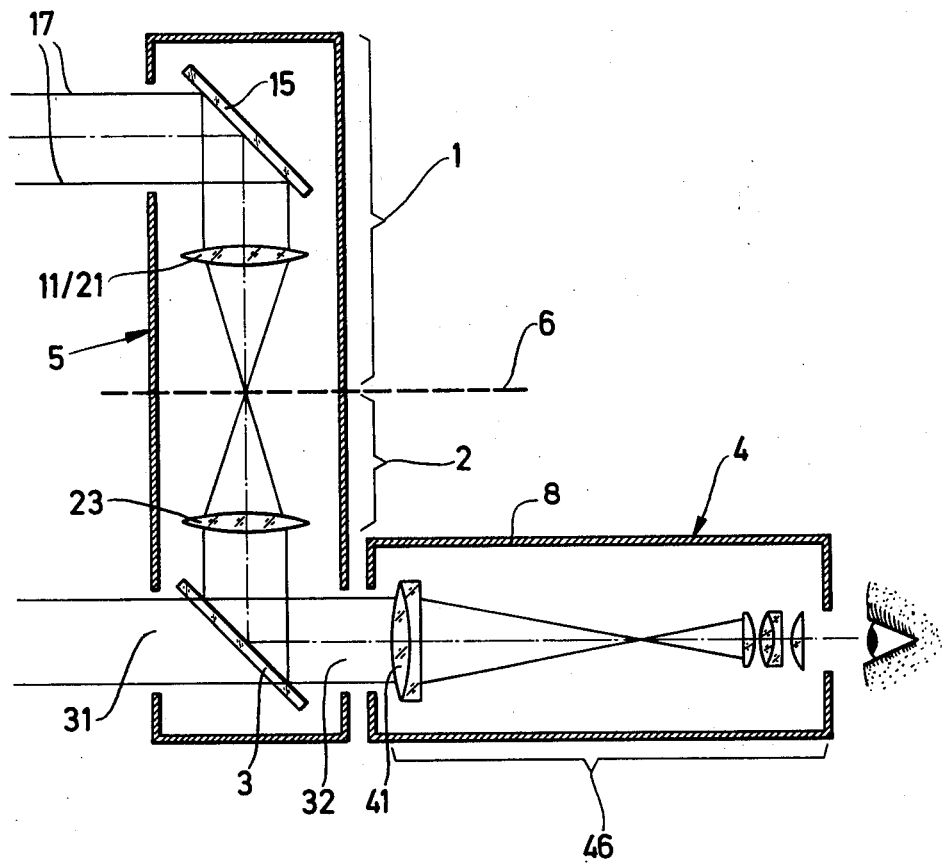

United States Patent [19]
Menke et al.

[11] 4,166,953
[45] Sep. 4, 1979

[54] ADAPTOR IN FORM OF A SPECTRAL CONVERTER

[75] Inventors: Josef F. Menke, Glücksburg; Rainer Hofmeister, Bammental, both of Fed. Rep. of Germany

[73] Assignee: Industrie Automation GmbH & Co., Fed. Rep. of Germany

[21] Appl. No.: 826,452

[22] Filed: Aug. 22, 1977

[51] Int. Cl.² .............................................. H01J 31/49
[52] U.S. Cl. .................................................... 250/333
[58] Field of Search ........................ 250/330, 333, 334; 350/1, 2, 6, 7

[56] References Cited
U.S. PATENT DOCUMENTS

| | | | |
|---|---|---|---|
| 2,946,255 | 7/1960 | Bolay | 250/333 |
| 3,641,348 | 2/1972 | Schwarz | 250/334 |
| 3,941,923 | 3/1976 | Wheeler | 250/334 |
| 3,973,124 | 8/1976 | Astheimer | 250/334 |

Primary Examiner—Davis L. Willis
Attorney, Agent, or Firm—Becker & Becker, Inc.

[57] ABSTRACT

An afocal spectral converter as adaptor for existing aiming and sighting devices for the conversion for instance of a heat picture into a visible picture. The arrangement includes the combination of an infrared picture receiving unit with a picture reproducing unit in such a way that the entire system has the enlargement 1:1. The connection of the adaptor with the main device is such that the optical axis of the picture receiving unit is parallel to the optical axis of the main device, and the parallel ray bundle of the picture reproducing unit is so imaged into the main device that the latter will not be influenced.

10 Claims, 3 Drawing Figures

ADAPTOR IN FORM OF A SPECTRAL CONVERTER

The present invention relates to an afocal spectral converter as adaptor for existing aiming and sighting mechanisms for conveyors for instance of a heat picture into a visible picture. The adaptor should be such that it can be mounted on the main device without adjustment and without in any way changing the aiming direction of the aiming or sighting device. From the geometric optical system, afocal adaptors have become known, the object of which consists in making an enlarging switch-over. All of these devices, however, bring about a change in the aiming direction if the optical axis of the aiming telescope does not coincide with the optical axis of the focal adaptor. Only with an enlargement of 1:1 and with a parallelism of the entering rays to the exiting rays, such adaptor will not change the aiming direction even when the optical axis of the adaptor does not coincide with the optical axis of the aiming telescope. In the sighting optical system, however, adaptors with the enlargement 1:1 are of no interest because they do not bring about any optical effect.

It is, therefore, an object of the present invention to provide an afocal spectral converter as adaptor of a simple and light construction with which the incoming IR rays are converted into visible rays, which visible rays can be observed by the main device.

It is a further object of this invention that with the arrangement set forth in the preceding paragraph the sight of the main device will not be affected by the main device.

These and other objects and advantages of the invention will appear more clearly from the following specification in connection with the accompanying drawings, in which:

FIG. 1 diagrammatically illustrates the operation of the adaptor according to the invention in combination with the main device.

Figure 2:
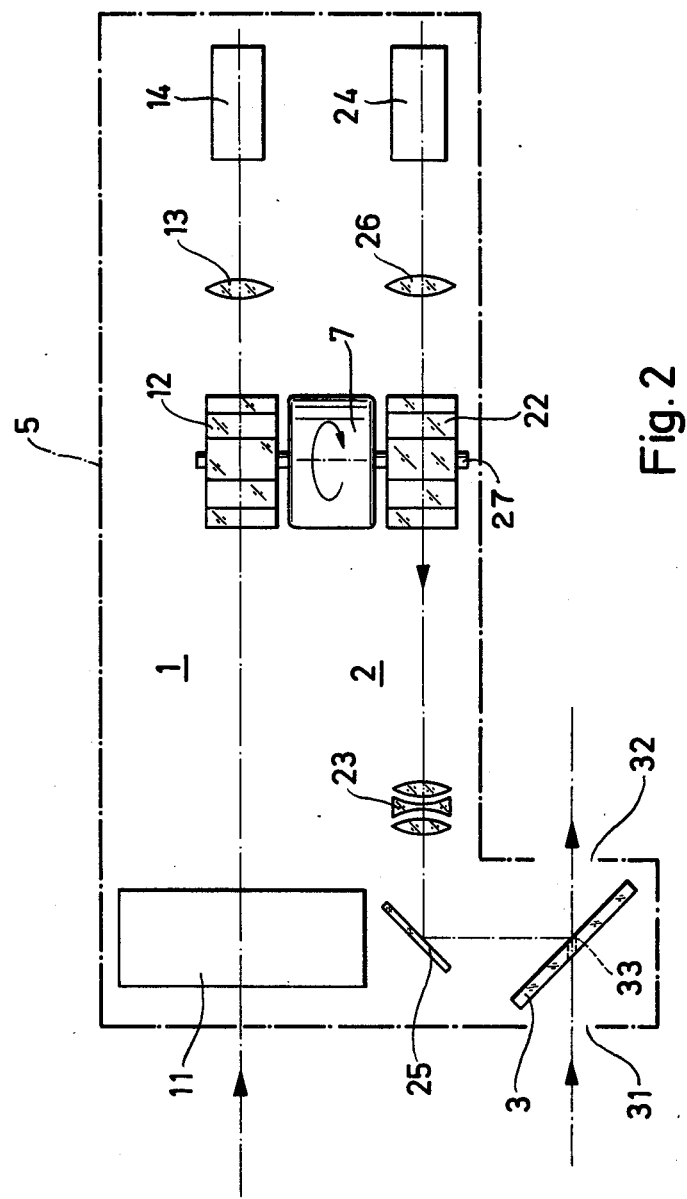

FIG. 2 diagrammatically illustrates the optical construction of the adaptor according to the invention.

Figure 3:
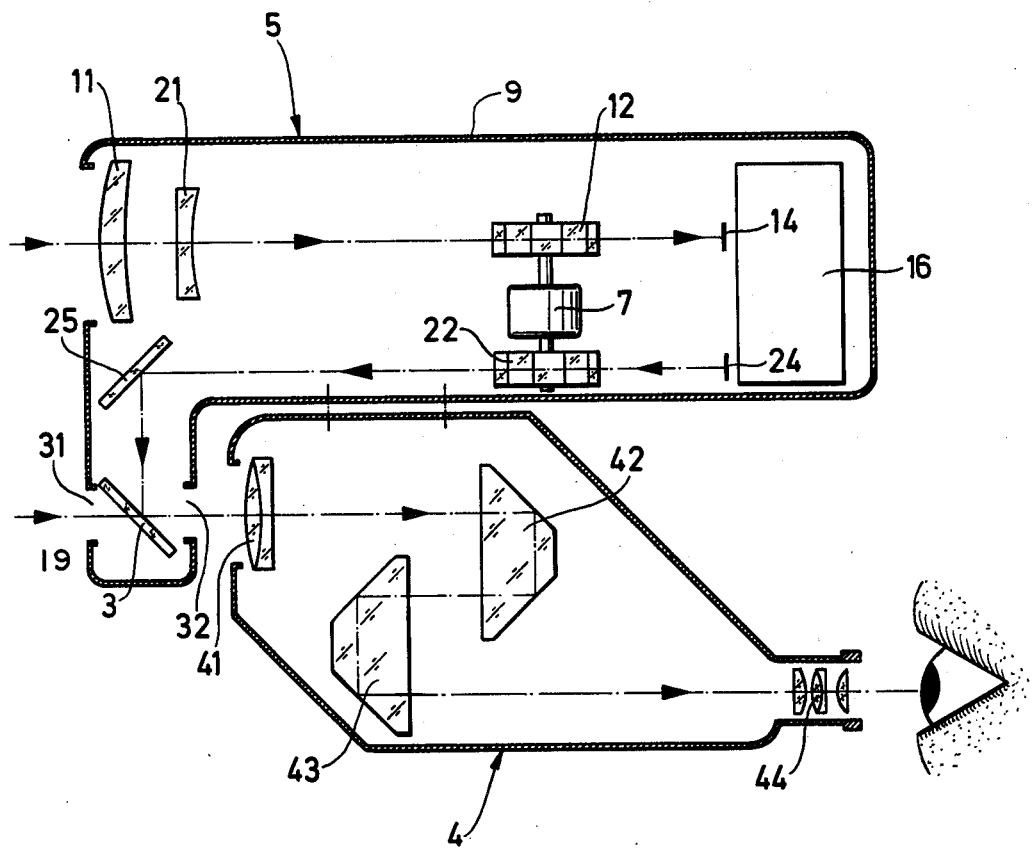

FIG. 3 diagrammatically illustrates the way of mounting an adaptor according to the present invention on a customary observing and aiming device.

An afocal spectral converter as adaptor for existing aiming and sighting devices for conversion for instance of a heat picture into a visible picture is characterized primarily by the combination of an infrared picture receiving unit with a picture reducing unit in such a way that the total system has the enlargement 1:1, and is furthermore characterized in that the connection of the adaptor with the main device is such that the optical axis of the picture receiving unit extends parallel to the optical axis of the main device. The said afocal spectral converter is furthermore characterized in that the parallel ray bundle of the picture reproducing unit is so imaged in the main device that the latter will not be affected. With the design according to the invention, the conversion of thermal radiation into visible radiation is effected at a high degree of efficiency in conformity with the principle of a frequency converter. The enlargement 1:1 brings about that in the parallel ray path, the heat picture as to its contours corresponds precisely to the visible picture and therefore can be imaged with the visible picture so as to be identical in contour and cover each other (deckungsgleich). The parallelism of the optical axis of the picture receiving unit with the optical axis of the main device makes it possible to image the parallel ray bundle of the picture reproduction unit in such a way into the main device that the latter will not be affected.

The principle underlying the present invention permits a normal operation during daylight while the thermal picture is imaged to the visible picture on the same scale and in a manner so that the contours cover each other. In this way, a mixed picture is obtained with which the spectral lines red and green are in their thermal picture content blended into the visible spectral range. In this connection, the thermal picture is adjustable as to its intensity. The mixed picture combines the advantages of viewing during daylight with the advantages of viewing thermally. For instance, optically camouflaged aims can be easily identified in the thermal range. If the device is so designed that the optical axis of the reproducing unit extends parallel to the optical axis of the picture receiving unit, it is possible to place a polygonal prism serving for receiving the heat picture onto a common shaft with the polygonal prism writing the visible picture whereby in both instances precise synchronous sensing will be possible. The conversion of the heat signals received by a detector into an optical picture can be effected in a known manner through the intervention of one or more luminescence diodes.

From the geometric optical system, afocal adaptors are known for enlarging switch-over. All of these adaptors bring about a change in the aiming direction if the optical axis of the aiming telescope does not coincide with the optical axis of the afocal adaptor. Only with the enlargement 1:1 and when parallelism exists between the entering rays and the exiting rays, such adaptor does not change the aiming direction even when the optical axis of the adaptor does not coincide with the optical axis of the main device.

This principle applied to a heat picture means that the picture receiving unit and the picture reproducing unit of a heat picture device are so designed with regard to each other that the total system has the enlargement 1:1 and the optical axis of the picture receiving unit is parallel to the axis of the picture reproducing unit.

Thus, on the same optical axis a reversal occurs of the IR-ray bundle entering at an angle $\alpha$ the plane of an IR detector.

After conversion of the IR radiation into radiation visible to the eye through luminescence diodes, the rays will at the same angle $\alpha$ leave the adaptor (converter) and in an appropriate manner can enter the inlet pupil of an optical sighting or aiming device. In this way, the requirements are met for the entry into an anti-parallax system, namely that the axis of the adaptor extends parallel for the ray inlet and ray outlet and thus becomes independent from the adjustment of the main device.

Therefore, it is also an important factor of the device according to the invention that it shows merely a displacement of the field of view in the heat picture when viewing through the sight of the main device without affecting the aiming precision when the line of sighting of the main device does not precisely coincide with the line of sighting of the adaptor.

It is, of course, to be understood that the adaptation of the heat picture-converter will principally occur also in separate pupils. However, in such an instance it must be assured that the inner device angle of the main device is identical with the angle of the adaptor for the entry and exit of the rays.

With normal polygonal prisms, it is necessary that the line displacement is effected by means of an additional element for instance an oscillating or vibrating mirror. It is easier and simpler to carry out such line displacement by means of a polygon having cross or dihedral mantle surfaces. Each mantle surface of such polygonal prism senses another line of the total picture so that during one rotation of the prism a sensing will occur of the total picture from left to right and from top to bottom. By a corresponding selection of the adjusting angle of the sides with regard to the axis of the prism, it is possible also to produce a representation by means of a coarse-fine-definition of a picture (Rasterung). This means that the aims, which normally have a higher temperature than the background appear red, whereas the background appears green.

In order in case of need, to be able to post-adjust the parallel position of the receiving unit and of the reproduction unit of the device, it is expedient that in one of the two optical channels there is arranged an element for the parallel adjustment.

The imaging of the heat picture made visible into the main device is effected by a spectral divider which with the applied adaptor is arranged in front of the entry pupil of the main device. This spectral divider is so designed that it permits the rays of the visible range to pass and reflects the rays emanating from the luminescence diodes. In this way, the daylight sight is not impeded by the adaptor device whereas the rays emanating from the adaptor are reflected and imaged into the path of the rays of the main device. The heat picture made visible is superimposed upon the natural picture registered by the main device. Together with the main device, the adaptor forms a total combination which can be used as daylight device and also as night viewing device. Also with normal operation during daylight the thermal picture can be imaged on the same scale and made visible. With the coming of dawn or misty weather, the viewing of the aim with the mere daylight viewing device is sometimes suddenly disturbed so that the desire occurs to switch on the night viewing device. In such instances, it is expedient when the adaptor can be placed upon the main device by a few manual operations and can be connected thereto. It is, therefore, suggested according to the invention to equip the device with easily detachable connecting means for connection to the main device.

Referring now to the drawings in detail, the adaptor comprises two units, namely receiving unit 1 in which the IR-rays emitted by the object are sensed and conveyed to the detector, and the reproducing unit 2 in which the rays emitted by the luminescence diodes are combined to a picture and conveyed further. The separating line 6 in this instance represents the entire electronics by means of which the conversion of the received IR-rays into visible rays are effected through a video signal and by means of luminescence diodes. The incoming IR-rays 17 are first deviated by the mirror 15, are then focussed by the lense group 11/21 and thus reach the detector. The rays coming from the luminescence diodes are converted in the collimator 23 into parallel rays and in this way passed to a spectral divider 3 which images said last mentioned rays through the exit opening 32 and the entrance pupils 41 into the path of rays of the main device. The optical system of the main or fundamental device is designated with the reference numeral 46. The ray divider 3 is so designed that it permits the passage of the natural visible rays and reflects the rays coming from the luminescence diodes. Opposite the exit opening 32 there is provided an entrance pupil 31 through which the visible rays then enter the adaptor. In this way, a heat picture is superimposed upon the natural picture visible by the main device, which heat picture indicates in different colors the different temperatures occurring on the observed object. The enlargement ratio of 1:1 assures that both pictures are identical in size and contour so as to cover each other.

FIG. 2 diagrammatically illustrates the interior buildup of the adaptor. The entry objective is indicated by the reference numeral 11 while the reference numeral 12 indicates a polygonal prism which together with a second polygonal prism 22 is mounted on one and the same shaft 27 and is driven by a common motor 7. In this way, a precise synchronous rotary movement of the two polygonal prisms will be realized. Arranged behind the polygonal prism 12 is a transformation optical system 13 by which the incoming IR-rays are conveyed to a detector 14. The transformation of the IR-rays received by the detector into visible rays is effected in a manner known per se through the intervention of a feeder signal and luminescence diodes 24. The visible rays emanating from the luminescence diodes pass through lens 26 into the polygonal prism 22 which records the visible heat picture, and then through a collimator 23 to a deviating mirror 25. The mirror 25 reflects the rays and conveys the same to the spectral divider 3 from which the rays are imaged in the described manner into the path of the rays of the main device. In the housing 9 which surrounds the spectral divider 3 there is for this purpose provided an exit opening 32. Opposite the opening 32 there is provided an entrance opening 31 for the visible rays which after passing through the spectral divider 3 likewise pass into the entrance pupil of the basic or main device. In the ray divider there is provided a hole for checking purposes.

FIG. 3 illustrates the attachment of the adaptor 5 to the main device 4. To the parts of FIG. 3 the same designations have applied as described in connection with FIGS. 1 and 2. The housing 9 of the adaptor 5 forms a longitudinally shaped hollow body and houses the optical and electronic part of the device. For purposes of transmitting the IR-rays made visible into the main device, the front portion of housing 9 is provided with a downward extension 19. As will be seen from FIG. 3, the arrangement is such that in the assembled device, the axes of the openings 31 and 32 of the adaptor 5 are in alignment with the axis of the entrance pupil 41 of the main device 4. This brings about a precise superimposition of the received IR picture made visible upon the natural picture received through opening 31. Behind the entrance pupil 41 of the main device there is arranged a deviating prism 42 which deviates the rays and conveys the same to a second deviating prism 43. After one more deviation by the prism 43, the beams pass into the eyepiece 44.

It is, of course, to be understood that the present invention is by no means limited to the specific showing in the drawings, but also comprises any modifications within the scope of the appended claims.

What we claim is:

1. An adaptor in form of an afocal spectral converter operating as a ray divider for conversion of a heat picture into a visible picture comprising in combination: an existing first device including aiming and sighting means, a second auxiliary device representing adaptor means optically connected to said existing first device and including a receiving unit for receiving infrared rays defining a heat picture and also including a visible picture reproducing unit, the entire system having an enlargement ratio of 1:1, means for connecting said second auxiliary device to said existing first device in such a way that an axis of the path of the rays entering the receiving unit of said second auxiliary device is situated eccentrically but substantially parallel to the optical axis of said existing first device, and means for imaging the parallel ray bundle leaving said picture reproducing unit without affecting said existing first device.

2. An afocal spectral converter in combination according to claim 1, in which said receiving unit is operable to emit electrical signals, and in which said second device includes a first rotatable polygonal prism for cartesian sensing a heat picture in the path of rays entering said receiving unit for converting electrical signals emitted by said receiving unit into a visible picture in the path of rays of said reproducing unit, a second rotatable polygonal prism, shaft means common to said first and second prisms, and motor means drivingly connected to said common shaft means for synchronously driving said first and second prisms.

3. An afocal spectral converter in combination according to claim 2, in which said first and second polygonal prisms are designed as dihedral polygonal prisms.

4. An afocal spectral converter in combination according to claim 2, in which said two polygonal prisms and the drive motor therefor form a unit tiltable about an axis intersecting the axis of said common shaft means at an angle of substantially 90°, electric drive means being provided for tilting said unit.

5. An afocal spectral converter in combination according to claim 1, which includes adjusting means in at least one of said optical paths of said receiving unit and reproducing unit for adjusting said units relative to each other.

6. An afocal spectral converter in combination according to claim 1, which includes a ray divider arranged in the path of the parallel rays of said reproducing unit.

7. An afocal spectral converter in combination according to claim 1, which includes a spectral divider arranged in the path of the parallel rays of said reproducing unit.

8. An afocal spectral converter in combination according to claim 1, in which said first and second devices are detachably connected to each other.

9. An afocal spectral converter in combination according to claim 1, in which the optical axis of said receiving unit extends substantially perpendicular to the optical axis of said first device.

10. An afocal spectral converter in combination according to claim 1, in which the optical axis of said picture reproducing unit extends substantially parallel to the axis of said picture receiving unit.

* * * * *